(12) United States Patent
Hauptmann et al.

(10) Patent No.: US 7,012,979 B2
(45) Date of Patent: Mar. 14, 2006

(54) TONE SIGNAL DETECTION CIRCUIT FOR DETECTING TONE SIGNALS

(75) Inventors: Jörg Hauptmann, Wernberg (AT); Thomas Pötscher, Villach (AT); Michael Staber, Villach (AT); Dietmar Straeussnigg, Villach (AT); Hubert Weinberger, Soboth (AT)

(73) Assignee: Infineon Technologies AG, München (DE)

( * ) Notice: Subject to any disclaimer, the term of this patent is extended or adjusted under 35 U.S.C. 154(b) by 781 days.

(21) Appl. No.: 09/942,518

(22) Filed: Aug. 29, 2001

(65) Prior Publication Data

US 2002/0074987 A1    Jun. 20, 2002

(30) Foreign Application Priority Data

Sep. 1, 2000   (DE)   ................... 100 43 160

(51) Int. Cl.
 *H04L 7/00* (2006.01)
(52) U.S. Cl. .............. 375/355; 375/354; 327/141; 714/12
(58) Field of Classification Search .............. 375/355, 375/200, 206, 354; 327/141; 370/503; 714/12
See application file for complete search history.

(56) References Cited

U.S. PATENT DOCUMENTS

| | | | | |
|---|---|---|---|---|
| 3,885,108 A | * | 5/1975 | Zock ........................ | 379/32.04 |
| 4,297,533 A | * | 10/1981 | Gander et al. ............... | 708/312 |
| 4,323,881 A | * | 4/1982 | Mori ........................ | 340/7.33 |
| 4,332,978 A | * | 6/1982 | Streeter .................... | 381/16 |
| 4,669,114 A | * | 5/1987 | Reesor et al. ............... | 379/257 |
| 5,442,694 A | * | 8/1995 | Chitrapu et al. ......... | 379/373.01 |
| 5,920,589 A | * | 7/1999 | Rouquette et al. .......... | 375/147 |
| 5,999,561 A | * | 12/1999 | Naden et al. ............... | 375/142 |
| 6,035,001 A | * | 3/2000 | Eklund et al. ............. | 375/316 |
| 6,486,975 B1 | * | 11/2002 | Verreault et al. .......... | 358/445 |
| 6,639,939 B1 | * | 10/2003 | Naden et al. ............... | 375/140 |
| 6,661,891 B1 | * | 12/2003 | Djadi et al. ................ | 379/386 |
| 2002/0136337 A1 | * | 9/2002 | Chatterjee et al. ......... | 375/355 |
| 2002/0196921 A1 | * | 12/2002 | Bohl .................... | 379/213.01 |

FOREIGN PATENT DOCUMENTS

DE    19506544 A1    9/1996

OTHER PUBLICATIONS

Aziz et al., "An Overview of Sigma-Delta Converters," IEEE Signal Processing, vol. 13 (No. 1), p. 61-72, (Jan., 1996).

* cited by examiner

Primary Examiner—Stephen Chin
Assistant Examiner—Erin M. File
(74) Attorney, Agent, or Firm—Jenkins, Wilson & Taylor, P.A.

(57) ABSTRACT

Tone signal detection circuit for a receiving circuit for detecting at least one tone signal of predetermined tone signal frequency ($f_E$) which is contained in a received analog input signal, comprising a reference signal generator (41) for generating an analog converter reference signal which consists of a reference DC ($V_{refDC}$) and a periodic reference AC ($V_{refAC}$) having a variable fundamental frequency ($f_G$), which is superimposed on the reference DC, an analog/digital converter (11) for converting the analog input signal into a digital data stream in dependence on the analog converter reference signal ($V_{ref}$); and comprising a digital control circuit (20) which adjusts the variable fundamental frequency ($f_G$) of the reference signal ($V_{ref}$) generated by the reference signal generator (42) in accordance with the predetermined tone signal frequencies ($f_G$) of the tone signals to be detected and evaluates the digital data stream output by the digital analog/digital converter (11) for detecting a data pattern corresponding to the tone signal.

15 Claims, 4 Drawing Sheets

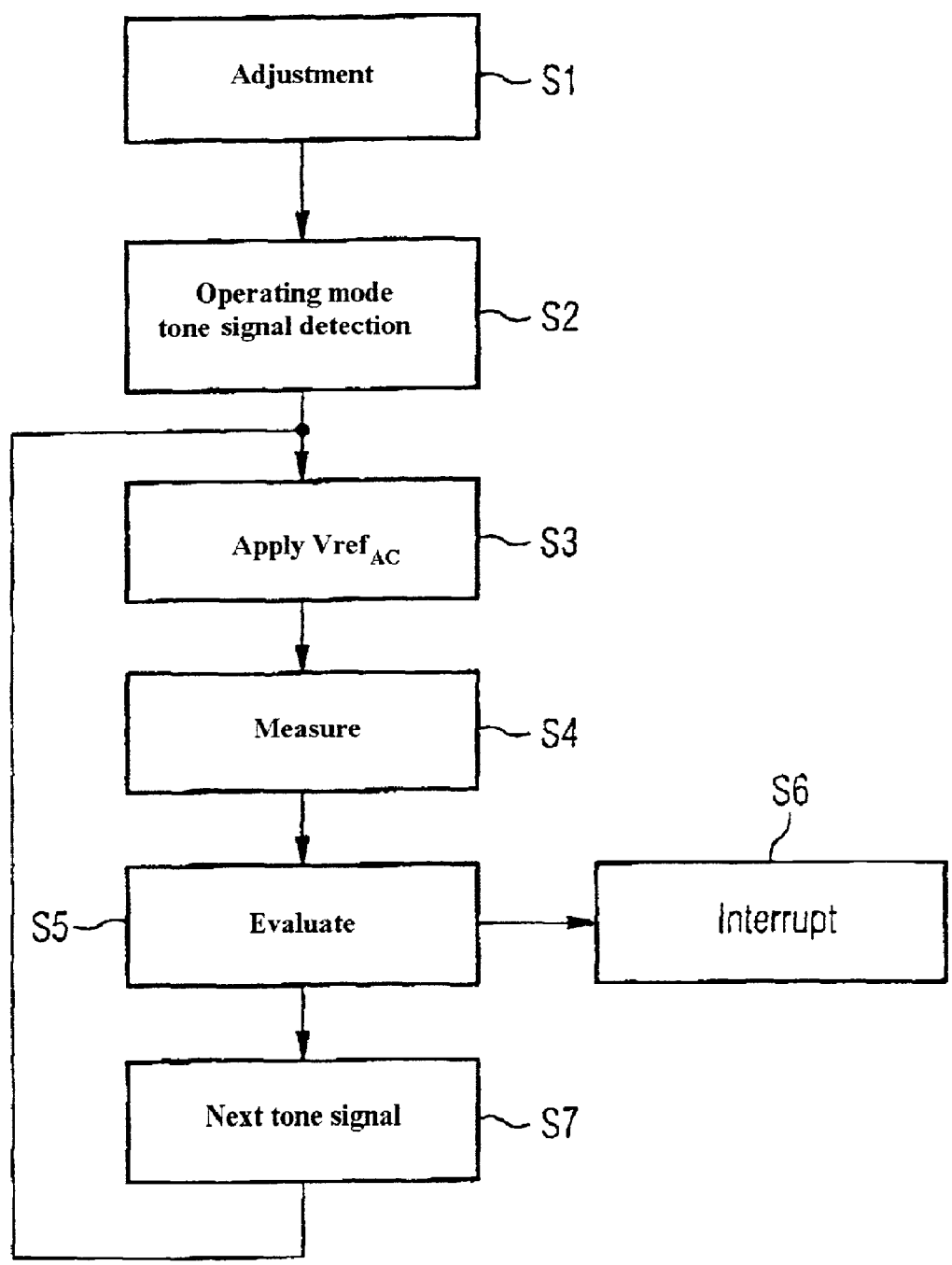

TONE SIGNAL DETECTION CIRCUIT FOR DETECTING TONE SIGNALS

TECHNICAL FIELD

The invention relates to a tone signal detection circuit for detecting at least one tone signal having a predetermined tone signal frequency, the tone signal being contained in a received analog input signal.

RELATED ART

Tone signals are added to an analog data signal as control signals by transmitting devices so that the associated receiving circuit or the receiver can be driven in dependence on the received tone signals. For example, modem circuits contain signal receivers which extract tone signals for controlling the modem from the received analog data signal.

FIG. 1 shows a tone signal detection circuit according to the prior art. An analog input signal which, in addition to the analog data signal, also contains tone signals having certain tone signal frequencies passes via a signal input E to an automatic gain control (AGC) circuit which outputs this amplified analog input signal to a following anti-aliasing filter. From the AAf, the filtered analog input signal passes to a signal input of an analog/digital converter (ADC) which, in dependence on a reference DC level $V_{refDC}$ converts the analog input signal present at the signal input into a digital data stream. The analog reference voltage level $V_{refDC}$ is generated by a reference voltage source $U_Q$. The digital data stream is supplied to an interface circuit IF and passes from there into a data processing unit DVE in which the digital data stream is decoded and evaluated for further data processing.

The analog input signal present at the signal input E contains tone signals having discrete frequencies which are supplied to a tone signal amplifier TSV. The amplified tone signals, which are used for controlling the receiver, pass from the tone signal amplifier TSV to adjustable band-pass filters BP, the frequency of which can be adjusted in dependence on the discrete frequencies of the tone signals to be detected. As an alternative, a separate band-pass filter BP is provided for every known tone signal frequency. The band-pass filters BP are in each case followed by a comparator circuit K having an adjustable threshold value. If the threshold value level of the comparator K is exceeded, the associated tone signal detection circuit TD connected via the signal output of the comparator K detects that the associated tone signal is contained in the analog input signal and outputs a corresponding detection signal to a central control circuit of the receiver.

The tone signal detection circuit according to the prior art, shown in FIG. 1, has the disadvantage that either a separate band-pass filter BP is necessary for each tone signal or an analog band-pass filter BP having an elaborate circuit must be provided which can be adjusted to all tone signal frequencies occurring. The circuit expenditure for detecting the tone signals is, therefore, very high in the conventional tone signal detection circuit shown in FIG. 1.

A further disadvantage of the tone signal detection circuit according to the prior art, shown in FIG. 1, consists in that the tone signal detection circuit is inflexible with respect to changes of the tone signal frequency standard, i.e. cannot be reprogrammed when the tone signal frequencies are changed.

SUMMARY OF THE INVENTION

It is, therefore, the object of the present invention to create a tone signal detection circuit which can be programmed for detecting various tone signals and which can be implemented with little circuit expenditure.

According to the invention, this object is achieved by a tone signal detection circuit for detecting at least one tone signal having a predetermined tone signal frequency, having the features specified in patent claim 1.

The invention creates a tone signal detection circuit for detecting at least one tone signal having a predetermined tone signal frequency, the tone signal being contained in a received analog input signal, comprising a reference signal generator for generating an analog converter reference signal which consists of a reference DC and a periodic reference AC signal, which is superimposed on this reference DC and having a variable fundamental frequency, an analog/digital converter for converting the analog input signal into a digital data stream in dependence on the analog converter reference signal, and comprising a digital tone signal detection circuit which adjusts the variable fundamental frequency of the reference signal generated by the reference signal generator in accordance with the predetermined tone signal frequencies of the tone signals to be detected and evaluates the digital data stream output by the analog/digital converter for detecting a data pattern corresponding to the tone signal.

The basic concept of the tone signal detection circuit according to the invention consists in also using the analog/digital converter, which is already contained in the receiver for converting the useful analog input signal, for detecting tone signals which are contained in the analog input signal.

For this purpose, the analog/digital converter is additionally used as mixing stage for mixing the analog input signal with the analog converter reference signal generated by the reference signal generator.

The reference signal generator of the tone signal detection circuit according to the invention preferably consists of a reference voltage source for generating a reference DC, a controllable signal generator for generating a periodic reference AC signal in dependence on a fundamental-frequency adjusting signal, received by the digital tone signal detection circuit, for adjusting the fundamental frequency of the periodic reference AC signal, and an adder which adds the difference DC to the periodic reference AC for forming the analog converter reference signal.

In a particularly preferred embodiment of the tone signal detection circuit according to the invention, the digital control circuit contains a zero transition counting device which counts the number of zero transitions of the digital data stream output by the analog/digital converter, the control circuit detecting a tone signal when the number of zero transitions per time essentially corresponds to a predetermined nominal zero transition rate.

The various nominal zero transition rates for the various tone signals to be detected can be preferably adjusted in the digital control circuit.

The digital control circuit of the tone signal detection circuit according to the invention preferably contains a comparator circuit with adjustable signal threshold values.

The digital control circuit preferably also exhibits digital band-pass filters for band-pass filtering the digital data stream.

In the digital control circuit, the detected tone signals are preferably temporarily stored in a memory.

The digital control circuit preferably outputs a corresponding interrupt control signal to a central controller of the receiver circuit with a predetermined temporarily stored tone signal combination which consists of at least one tone signal.

The analog/digital converter preferably contains a digital filter and a decimation filter.

The received analog input signal is preferably an xDSL signal.

The receiver circuit in which the tone signal detection circuit according to the invention is provided is preferably a modem receiver circuit.

The data modem in which the tone signal detection circuit according to the invention is contained, preferably switches from a standby mode to a data reception mode on reception of an interrupt signal from the control circuit by the central controller of the receiver circuit.

In a preferred embodiment of the tone signal detection circuit according to the invention, the analog/digital converter is preceded by an anti-aliasing filter (AAF).

The anti-aliasing filter is also preferably preceded by an automatic gain control circuit.

The digital data stream output by the analog/digital converter is preferably evaluated by a following data evaluation circuit of the receiver.

According to the invention, a conventional analog/digital converter is used as mixing stage for mixing an analog input signal with an analog reference signal.

In this arrangement, the analog/digital converter converts the analog input signal supplied to it into a digital data stream which is evaluated for detecting a tone signal.

BRIEF DESCRIPTION OF THE DRAWINGS

In the text which follows, preferred embodiments of the tone signal detection circuit according to the invention for a receiver circuit are described in order to explain features which are essential to the invention, referring to the attached figures, in which:

FIG. 3 shows a flowchart of a program for detecting tone signals which is running in the digital control circuit;

DETAILED DESCRIPTION OF THE INVENTION

Figure 1:
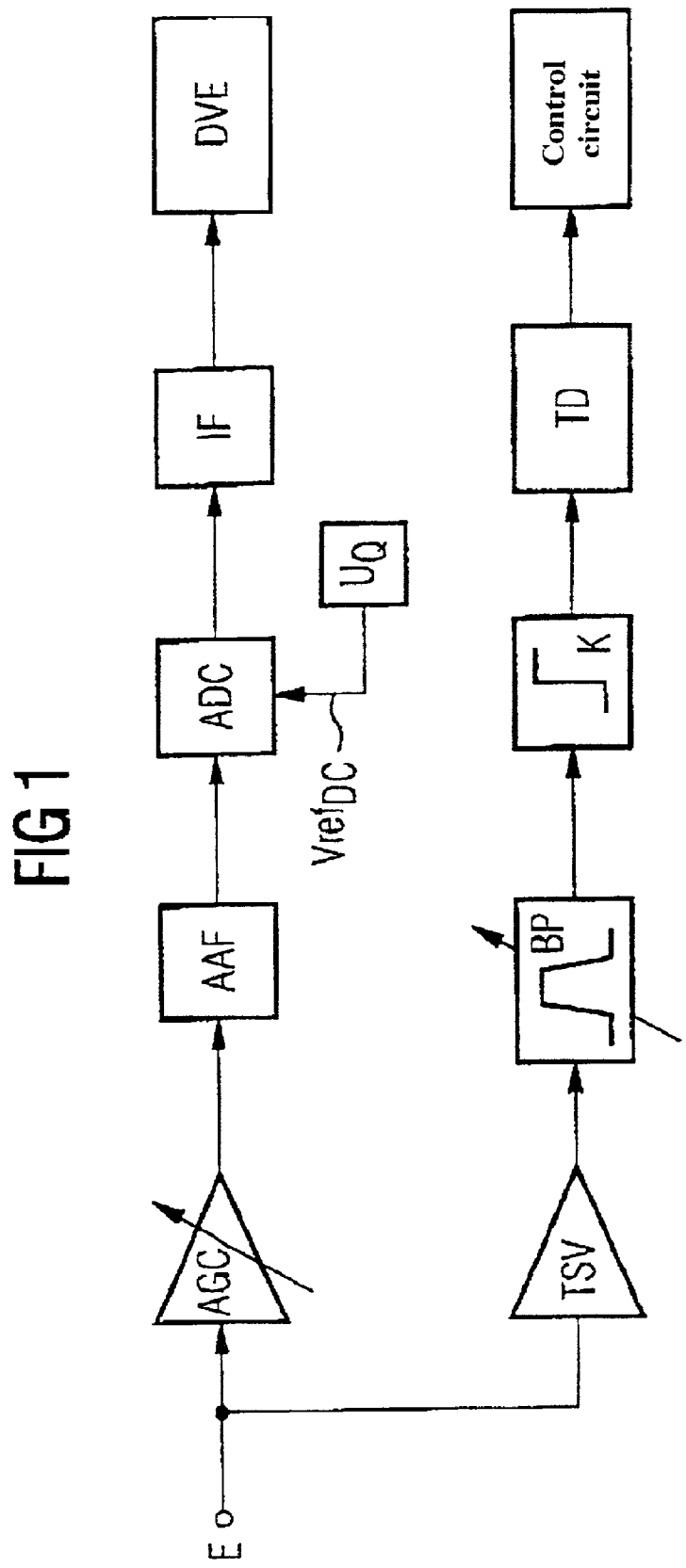
FIG. 1 shows a tone signal detection circuit according to the prior art.
Figure 2:
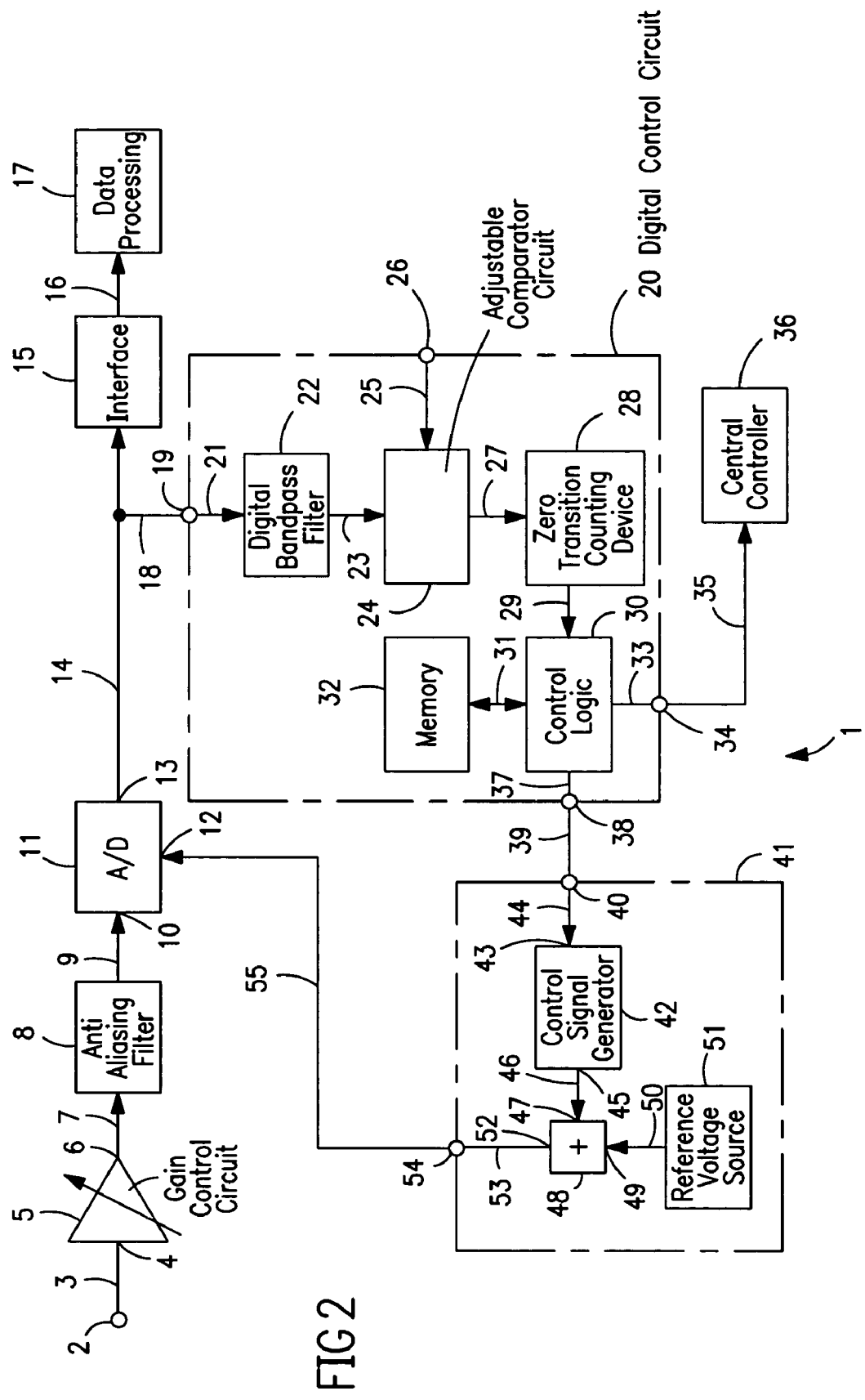
FIG. 2 shows a preferred embodiment of the tone signal detection circuit according to the invention.

As can be seen from FIG. 2, the tone signal detection circuit 1 according to the invention exhibits a signal input 2 for applying a received analog input signal. The tone signal detection circuit 1 shown in FIG. 2 forms, for example, a part of a receiver circuit of a data modem. The analog input signal present at signal input 2 consists of a useful analog signal and various tone signals having predetermined tone signal frequencies which are used for controlling the receiver circuit. The analog input signal present at the signal input 2 is supplied via a signal line 3 to the input 4 of a gain control circuit 5 which supplies the amplified analog input signal via an output 6 and a signal line 7 to a following anti-aliasing filter 8. The output of the anti-aliasing filter 8 is connected via a signal line 9 to an analog signal input 10 of an analog/digital converter 11. The analog/digital converter 11 converts the analog input signal present at the analog signal input 10 into a digital data stream in dependence on a converter reference signal present at a reference signal connection 12 and outputs the digital data to digital signal lines 14 via digital data outputs 13. The digital data generated in accordance with the analog input signal pass via the digital data lines 14 to an interface circuit 15 which forwards the digital data via digital data lines 16 to a data processing circuit 17 for data decoding and data evaluation. The analog/digital converter 11 preferably exhibits a digital filter and a decimation filter. In an operating mode for detecting tone signals, the A/D converter 11 is clocked at a lower rate than in a normal operating mode for converting useful signals into useful data. In the tone signal detection mode, the data processing circuit 17 is also clocked at a low clock rate so that the power dissipation $P_v$ of the tone signal circuit drops overall.

The converted digital data present on the data lines 14 are also supplied to a digital data input 19 of a digital control circuit 20 via data lines 18. The digital data input connection 19 of the digital control circuit 20 is connected to a digital band-pass filter 22 via a line 21. The digital band-pass filter 22 is preferably a third-order digital band-pass filter. The output of the band-pass filter 22 is connected via lines 23 to an adjustable comparator circuit 24, the adjustable signal threshold values of which have a hysteresis. The programmable signal threshold values can be adjusted or, respectively, programmed via adjusting lines 25 and an adjusting connection 26 of the digital control circuit 20. The output of the comparator circuit 24 is connected via lines 27 to a zero transition counting device 28 which counts the number of signal transitions of the digital data stream output by the analog/digital converter 11 and outputs the count value determined to a control logic 30 via a line 29.

The control logic 30 is connected via lines 31 to a memory 32 in which various nominal zero transition rates for the various tone signals to be detected are stored. The control logic 30 compares the number of zero transitions per time determined by the zero transition counting device 28 with the nominal zero transition rates stored in the memory 32. If the number of zero transitions per time determined essentially corresponds to a stored predetermined nominal zero transition rate, the control logic 30 of the digital control circuit 20 detects that the analog input signal present at the signal input 2 contains a tone signal. When a tone signal is detected, the tone signal is temporarily stored in the memory 32 by the control logic 30 until a predetermined tone signal combination consisting of at least one tone signal is present. As soon as a particular tone signal combination is detected by the control logic 30, the control logic 30 outputs, via a line 33 and an interrupt control connection 34 of the digital control circuit 20, an interrupt signal via an interrupt line 35 to a central controller 36 of the receiver. The central controller 36 detects the interrupt signal and changes the operating mode of the receiver in accordance with the interrupt signal received via the interrupt signal line 35.

The control logic 30 is connected to an adjusting connection 38 of the digital control circuit 20 via a line 37. The adjusting connection 38 is connected to a control connection 40 of a reference signal generator 41 via an adjusting line 39. The reference signal generator 41 contains a controllable signal generator 42 which is controlled by an adjusting signal present on the line 44 via a control connection 43. The controllable signal generator 42 generates a periodic reference AC signal $V_{refAC}$ in dependence on an adjusting control signal which is output by the control logic 30. The adjusting control signal adjusts the fundamental frequency of the periodic reference AC signal output by the controllable signal generator 42. The reference AC signal $V_{refAC}$ generated is supplied to a first input 47 of an adder 48 by the controllable signal generator 42 via a signal output 45 and a signal line 46. The adder 48 exhibits a further signal input 49 which, via a line 50, is present at a reference voltage source 51 for generating a reference DC $V_{refDC}$. The adder 48 adds the reference DC $V_{refDC}$ generated in the reference voltage source 51 and the periodic reference AC $V_{refAC}$ generated by the controllable signal generator 42 and outputs the composite signal $V_{ref}$ to a signal output 54 of the reference signal generator 41 via a signal output 52 and a line 53. The signal output 54 of the reference signal generator 41 is connected to the reference signal connection 12 of the analog/digital converter 11 via a line 55.

The controllable reference signal generator 42 for generating a periodic reference AC signal having a variable fundamental frequency $f_G$ preferably generates a periodic squarewave signal, the fundamental frequency $f_G$ of which is varied in accordance with the control signal output by the control logic 30. The periodic squarewave signal is superimposed on the reference DC $V_{refDC}$ in the adder 48. The reference DC with superimposed squarewave signal is supplied to the analog/digital converter via the line 55.

The following holds true for the digital output value present at the digital signal output 13 of the analog/digital converter 11:

$$\text{digital value} = \frac{V_{in}}{V_{ref}} \quad (1)$$

where $V_{in}$ is the input voltage of the analog input signal at the sampling time and $V_{ref}$ is the analog converter reference signal generated by the reference signal generator 41.

The analog converter reference signal $V_{ref}$ is composed of the reference DC $V_{refDC}$ and a periodic reference AC signal $V_{refAC}$ having a variable fundamental frequency $f_G$:

$$V_{ref} = V_{refDC} + V_{refAC} \quad (2)$$

The reference DC $V_{refDC}$ is generated by the reference DC source 51 and the periodic reference AC signal $V_{refAC}$ is generated by the reference signal generator 42. The fundamental frequency $f_G$ of the periodic reference AC signal $V_{refAC}$ is varied by the control logic 30.

$$V_{refAC} = A \cdot \sin(2\pi f_G \cdot t) \quad (3)$$

where A is the amplitude of the periodic reference AC signal and $f_G$ is the adjustable variable fundamental frequency of the reference AC signal.

The analog/digital converter 11 multiplies the inverse value of the analog reference signal $V_{ref}$ generated by the analog input signal $V_{in}$ present at the analog input connection 10, in accordance with equation (1) and thus acts like a mixing stage. The adjustable variable fundamental frequency $f_G$ of the periodic reference AC signal forms the mixing frequency of this mixing stage so that high-frequency tone signals having a certain tone signal frequency are down-converted to a certain intermediate frequency $f_Z$ by the analog/digital converter 11. The mixing frequencies or, respectively, the fundamental frequencies $f_G$ of the periodic reference AC signal can be programmed for all tone signals to be detected and can be stored in the memory 32 of the digital control circuit 20. The control logic 30 reads the necessary fundamental frequencies $f_G$, for detecting an associated tone signal, out of the memory 32 and drives the signal generator 42 for generating corresponding periodic reference AC signals. In this method, all fundamental frequencies $f_G$ considered for the various tone frequencies are preferably progressively switched through so that the reference signal generator 42 successively outputs various periodic reference AC signals having different fundamental frequencies $f_G$ which are superimposed on the reference DC $V_{refDC}$ in the adder 48. The switching-through of the various fundamental frequencies $f_G$ is preferably cyclic until a tone signal is detected by the digital control circuit 20.

FIG. 3 shows a simplified flowchart of various method steps for detecting tone signals within the digital controller 20.

In a step S1, the variable fundamental frequencies necessary for the various tone signals are adjusted or, respectively, programmed for the tone signal detection.

In step S2, the digital controller 20 switches over to an operating mode for detecting tone signals.

In step S3, a periodic reference AC signal $V_{refAC}$ having the variable fundamental frequency $f_G$ for a tone signal to be detected is generated and applied to the analog/digital converter 1.

After a certain period of time has elapsed, the number of zero transitions of the digital data signal is measured by the zero transition counting device 28 of the digital control circuit 20 in step S4 and output to the control logic 30.

In step S5, the control logic 30 calculates the number of signal zero transitions per time and compares them with the stored nominal zero transition rates for the various tone signals. If the number of calculated zero transitions per time corresponds to a predetermined nominal zero transition rate, a tone signal is detected. If necessary, the detected tone signal is temporarily stored in the memory 32 for detecting a particular tone signal combination, the tone signal combination consisting of at least one predetermined tone signal.

If all tone signals of a tone signal combination have been detected, the control logic 30 outputs a corresponding interrupt signal to the central controller 36 in a step S6.

In a step S7, the variable fundamental frequency $f_G$ is set for the next tone signal to be detected. The various fundamental frequencies $f_G$ for the various tone signals to be detected are cyclically set by the control logic 30 at the signal generator 42.

Figure 4A:
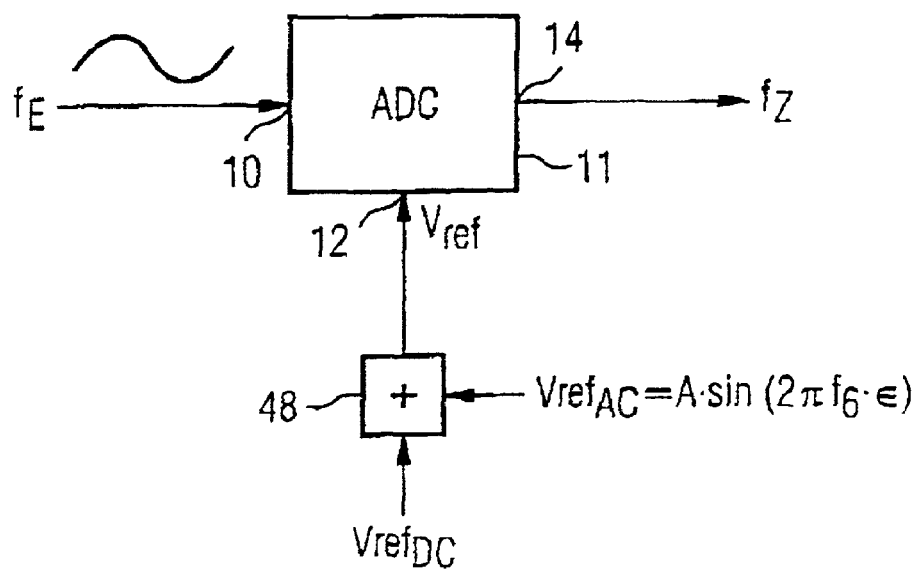
FIGS. 4a to c show the use of an analog/digital converter as mixing stage within the tone signal detection circuit according to the invention.
Figure 4B:
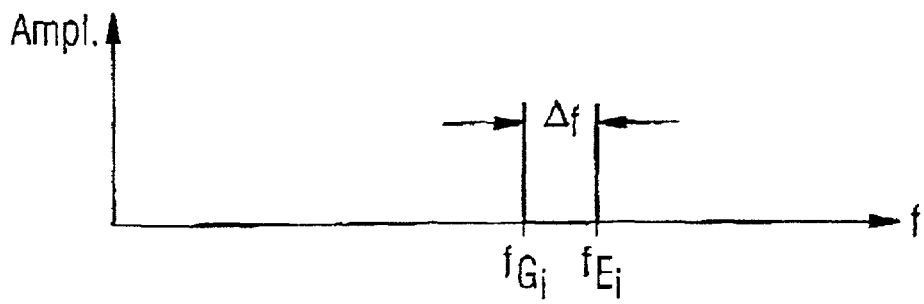
Figure 4C:

FIGS. 4a to c show the analog/digital converter 11 with its associated signal spectra.

The input tone signal having a tone signal frequency $f_E$, which is present at the signal input 10, is multiplied or, respectively, mixed with the inverse converter reference signal $V_{ref}$ in the analog/digital converter 11, the reference signal $V_{ref}$ having a discrete spectral frequency line at the fundamental frequency $f_G$. Multiplication in the time domain results in a convolution in the frequency domain so that the tone signal present is down-converted. The input frequency $f_E$ is down-converted to the intermediate frequency $f_Z$. The frequency interval $\Delta f$ between the fundamental frequency and the input frequency $f_E$ of the tone signal to be expected is adjusted in such a manner that the various tone signals are down-converted to the same intermediate frequency $f_Z$.

The number of various tone signals to be detected, and their signal frequencies with associated variable fundamental frequencies $f_G$ to be adjusted can be programmed in a simple manner in the signal detection circuit according to the invention. The tone signal detection circuit 1 according to the invention as shown in FIG. 2 can, therefore, be flexibly used for the most varied applications without selective band-pass filters with elaborate circuits becoming necessary.

The digital tone signal detection circuit 1 according to the invention additionally utilizes the existing analog/digital converter 11 as a mixing stage, the mixed signal obtained already being present in digital form and thus also being capable of being evaluated digitally. Since the analog input signals are down-converted to the same intermediate frequency $f_Z$, the digital control circuit 20 only needs a single fixed digital band-pass filter 22 in order to select this intermediate frequency $f_Z$.

The invention claimed is:

1. A tone signal detection circuit for a receiving circuit for detecting at least one signal having a predetermined tone signal frequency ($f_E$) which is contained in a received analog input signal, comprising:
   (a) a reference signal generator for generating an analog converter reference signal $V_{ref}$ which consists of a reference DC ($V_{refDC}$) and a periodic reference AC ($V_{refAC}$) having a variable fundamental frequency ($f_G$), which is superimposed on the reference DC ($V_{refDC}$);
   (b) an analog/digital converter for converting the analog input signal into a digital data stream in dependence on the analog converter reference signal ($V_{ref}$); and
   (c) a digital control circuit which adjusts the variable fundamental frequency ($f_G$) of the reference signal ($V_{ref}$) generated by the reference signal generator in accordance with the predetermined tone signal frequencies ($f_G$) of the tone signals to be detected and evaluates the digital data stream output by the analog/digital converter for detecting a data pattern corresponding to the tone signal.

2. The tone signal detection circuit as claimed in claim 1, wherein the reference signal generator exhibits a reference voltage source for generating the reference DC ($V_{refDC}$), a controllable signal generator for generating the periodic reference AC signal ($V_{refAC}$) in dependence on a fundamental-frequency adjusting signal, received by the digital control circuit, for adjusting the fundamental frequency ($f_G$), and an adder which adds the reference DC ($V_{refDC}$) to the periodic reference AC ($V_{refAC}$) for forming the converter reference signal ($V_{ref}$).

3. The tone signal detection circuit as claimed in claim 1, wherein the digital control circuit contains a zero transition counting device which counts the number of zero transitions of the digital data stream output by the analog/digital converter, the digital control circuit detecting a tone signal when the number of zero transitions per time corresponds to a predetermined nominal zero transition rate.

4. The tone signal detection circuit as claimed in claim 3, wherein various nominal zero transition rates of the tone signals to be detected can be adjusted in the digital control circuit.

5. The tone signal detection circuit as claimed in claim 1, wherein the digital control circuit contains a comparator circuit with adjustable signal threshold values.

6. The tone signal detection circuit as claimed in claim 1, wherein the digital control circuit exhibits a digital band-pass filter for band-pass filtering the digital data stream.

7. The tone signal detection circuit as claimed in claim 1, wherein the detected tone signals are temporarily stored in a memory of the digital control circuit.

8. The tone signal detection circuit as claimed in claim 1, wherein the digital control circuit outputs a corresponding interrupt signal to a central controller of the receiver circuit, with a predetermined tone signal combination which consists of at least one tone signal.

9. The tone signal detection circuit as claimed in claim 1, wherein the analog/digital converter contains a digital filter and a decimation filter.

10. The tone signal detection circuit as claimed in claim 1, wherein the received analog input signal is an xDSL signal.

11. The tone signal detection circuit as claimed in claim 8, wherein the receiver circuit is a modem receiver circuit.

12. The tone signal detection circuit as claimed in claim 11, wherein the modem receiver circuit switches the receiver circuit from a standby mode to a data reception mode by means of the central controller on reception of the interrupt signal from the digital control circuit.

13. The tone signal detection circuit as claimed in claim 1, wherein the analog/digital converter is preceded by an anti-aliasing filter.

14. The tone signal detection circuit as claimed in claim 13, wherein the anti-aliasing filter is preceded by an automatic gain control circuit.

15. The tone signal detection circuit as claimed in claim 1, wherein the digital data stream output by the analog/digital converter is evaluated by a following data processing circuit of the receiver.

* * * * *